US012601868B2

(12) United States Patent
Blomstedt

(10) Patent No.: US 12,601,868 B2
(45) Date of Patent: Apr. 14, 2026

(54) OPTICAL WAVEGUIDE ARRANGEMENT WITH IMPROVED CAPACITY

(71) Applicant: DISPELIX OY, Espoo (FI)

(72) Inventor: Kasimir Blomstedt, Espoo (FI)

(73) Assignee: DISPELIX OY, Espoo (FI)

( * ) Notice: Subject to any disclaimer, the term of this patent is extended or adjusted under 35 U.S.C. 154(b) by 282 days.

(21) Appl. No.: 18/567,293

(22) PCT Filed: Jun. 6, 2022

(86) PCT No.: PCT/FI2022/050390
§ 371 (c)(1),
(2) Date: Dec. 5, 2023

(87) PCT Pub. No.: WO2022/258885
PCT Pub. Date: Dec. 15, 2022

(65) Prior Publication Data
US 2024/0264355 A1 Aug. 8, 2024

(30) Foreign Application Priority Data

Jun. 10, 2021 (FI) ...................................... 20215677

(51) Int. Cl.
*F21V 8/00* (2006.01)
*G02B 6/10* (2006.01)
*G02B 27/01* (2006.01)
(52) U.S. Cl.
CPC ........... *G02B 6/0016* (2013.01); *G02B 6/105* (2013.01); *G02B 27/0101* (2013.01); *G02B 27/0172* (2013.01)

(58) Field of Classification Search
CPC .. G02B 6/0016; G02B 6/105; G02B 27/0101; G02B 27/0172
USPC ........................................................... 385/37
See application file for complete search history.

(56) References Cited

U.S. PATENT DOCUMENTS

| | | | |
|---|---|---|---|
| 2016/0231566 A1* | 8/2016 | Levola .................... | G02B 6/00 |
| 2018/0113309 A1* | 4/2018 | Robbins .............. | H04N 13/337 |
| 2019/0056591 A1* | 2/2019 | Tervo ................... | G02B 6/0038 |
| 2021/0064082 A1* | 3/2021 | Yang .................... | G02B 27/283 |
| 2022/0155502 A1* | 5/2022 | Melli ................. | G02B 27/0172 |

* cited by examiner

*Primary Examiner* — Jerry M Blevins
(74) *Attorney, Agent, or Firm* — Maschoff Brennan

(57) ABSTRACT

According to an example aspect of the present invention, there is provided an optical waveguide arrangement comprising an in¬coupling structure (103) arranged to diffract an incoming light signal having a spectral characteristic in visible spectrum into a first version of the light signal with a first polarization and a second version of the light signal with a second polarization, wherein the first polarization is at least partially orthogonal compared to the second polarization, and the in-coupling structure (103) is further arranged to diffractively couple the first and the second versions of the light signal into an optical waveguide (110) and the optical waveguide (110) arranged to convey the first version of the light signal with the first polarization and the second version of the light signal with the second polarization towards an eye (120), to generate a waveguide-based display.

18 Claims, 3 Drawing Sheets

OPTICAL WAVEGUIDE ARRANGEMENT WITH IMPROVED CAPACITY

FIELD

Embodiments of the present invention relate to an optical waveguide arrangement.

BACKGROUND

Optical waveguides are capable of conveying optical frequency light. By optical, or visible, frequencies it is meant light within about 400 to 700 nanometres in wavelength. Optical waveguides have been employed in displays, wherein light from a light field may be conveyed using one or more waveguides to suitable locations for release for a user's eye or eyes.

Head-Mounted Displays, HMDs, and Head-Up Displays, HUDs, can be implemented using optical waveguide technology, e.g., for augmented reality or virtual reality type applications. In augmented reality, a user sees a view of the real world and superimposed thereon supplementary indications. In virtual reality, the user is deprived of his view into the real world and provided instead a view into a software-defined scene.

In general, there is a need to provide improvements related to optical waveguide technology. More specifically, it would be useful to improve capacity of optical waveguides arrangements.

SUMMARY

According to some aspects, there is provided the subject-matter of the independent claims. Some embodiments are defined in the dependent claims.

According to a first aspect of the present invention, there is provided an optical waveguide arrangement comprising an in-coupling structure arranged to diffract an incoming light signal having a spectral characteristic in visible spectrum into a first version of the light signal with a first polarization and a second version of the light signal with a second polarization, wherein the first polarization is at least partially orthogonal compared to the second polarization, and the in-coupling structure is further arranged to diffractively couple the first and the second versions of the light signal into an optical waveguide and the optical waveguide arranged to convey the first version of the light signal with the first polarization and the second version of the light signal with the second polarization towards an eye, to generate a waveguide-based display.

Example embodiments of the first aspect may comprise at least one feature from the following bulleted list or any combination of the following features:

- the relative change in intensity of the first version of the light signal is the same, or essentially the same, as the relative change in intensity of the second version of the light signal, when the first and the second versions of the light signal propagate from the in-coupling region to an out-coupling region;
- the optical waveguide arrangement further comprises an out-coupling structure arranged to compensate for rotation of polarization state of the first version and the second version of the light signal, said rotation occurring when the first version and the second version of the light signal are conveyed in the optical waveguide;
- the spectral characteristic is a distinct spectral peak in visible spectrum, such as a certain wavelength;

- the first and the second versions of the light signal have the spectral characteristic in visible spectrum;
- the first version and the second version of the light signal overlap at least partially both spatially and in terms of their wave vectors and wavelengths, while conveyed in the optical waveguide;
- the in-coupling structure is arranged to guide the first version of the light signal to a first location in a wave vector annulus and the second version of the light signal to a second location in the wave vector annulus;
- the waveguide is made of glass, plastic, or any other suitable waveguide material having refractive index of at least 1.4, like at least 1.7, preferably at least 2.0;
- the relative change in intensity of the first version of the light signal is the same as the relative change in intensity of the second version of the light signal, when the first version and the second version of the light signal are conveyed in the optical waveguide;
- the optical waveguide arrangement comprises an out-coupling structure arranged to produce a combined image for an observer from the first and the second version of the light signals;
- the first and the second polarizations are partially mutually orthogonal, preferably fully orthogonal;
- the optical waveguide arrangement further comprises at least one processor configured to produce a light signal with a known polarization distribution across the image the light signal represents.

According to a second aspect of the present invention, there is provided an optical product, comprising the optical waveguide arrangement and a light source adapted to direct the light signal to the in-coupling structure.

According to a third aspect of the present invention, there is provided a personal display device, such as a head-mounted display or head-up display, comprising the optical waveguide arrangement and/or the optical product.

EMBODIMENTS

Embodiments of the present invention relate to an optical waveguide arrangement. The optical waveguide arrangement may comprise an optical waveguide and an in-coupling structure to couple an image into the optical waveguide, for example an in-coupling grating arranged to diffractively in-couple a light signal. The in-coupling structure may be further arranged to divide the light signal related to the image into a first and a second light signal. The first and the second light signals may have a first polarization and a second polarization, respectively. The use of different polarizations, such as vertical and horizontal polarizations or clockwise and counter-clockwise polarizations, enables differentiation of the first and the second light signals, even if said light signals would have the same, or about the same, spectral characteristic in visible spectrum, like a wavelength, have the same, or about the same, propagation angles, and occupy the same, or about the same, spatial positions in a waveguide out-coupling region. The waveguide capacity can be therefore doubled as for example two red light signals could be conveyed via the same, or almost the same, path inside a waveguide, thereby making it possible to convey two parts of an image with a waveguide geometry that in a conventional design has only the capacity for one of the parts, as long as independent polarization states are used for conveying the partial images.

Figure 1:
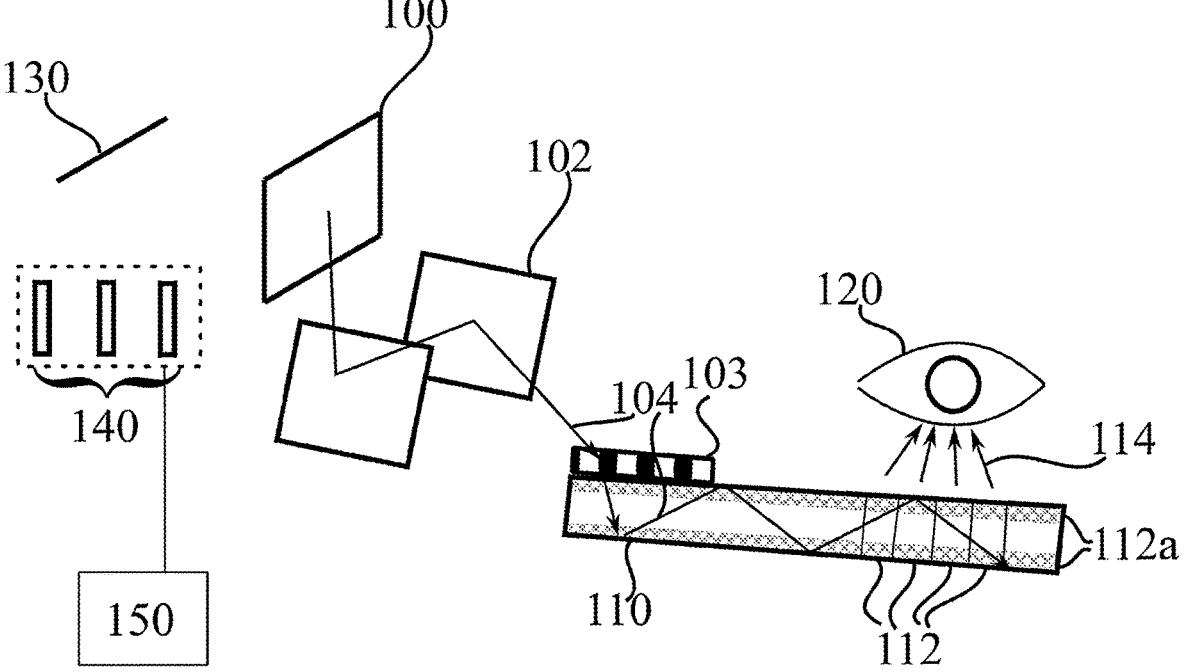
FIG. 1 illustrates an example system in accordance with at least some embodiments of the present invention.

FIG. 1 illustrates an example system in accordance with at least some embodiments of the present invention. The system may comprise a set of light sources 140. Light sources 140 may comprise laser or Light-Emitting Diode, LED, light sources, for example, wherein laser sources have the advantage that they are more strictly monochromatic than LEDs. Light sources 140 together with other optical components, for example a MEMS mirror 130, form an optical system which may be configured to generate a light field in angular space. The image is encoded in the light field. The light field is schematically illustrated in FIG. 1 as field 100. In some embodiments, a physical primary display may display an image of light field 100, while in other embodiments the system may comprise no physical primary display and the image is merely encoded in the light field which is distributed in angular space. Light signal 104 from light field 100 may be conveyed directly, or by, using optical guides 102 comprising, for example, mirrors and/or lenses, to an optical waveguide 110, to generate a waveguide-based display. The optical guides 102 are optional in the sense that depending on the specifics of a particular embodiment, they may be absent. In other words, optical guides 102 are not present in all embodiments.

Light signal 104 from a light source 140 may be directed to an in-coupling structure 103, such as a partially reflecting mirror, surface relief grating or other diffractive structures. The in-coupling structure 103 may comprise one or more in-coupling gratings and/or prisms for example. The in-coupling structure 103 may be arranged to guide the light ray 104 into the optical waveguide 110. That is to say, the in-coupling structure 103 may diffractively couple an image into the optical waveguide 110. As shown in FIG. 1, in some embodiments, the in-coupling structure 103 may be on a surface, or close to the surface, of the optical waveguide 110 for example. However, in some embodiments the optical waveguide 110 may comprise the in-coupling structure 103.

In some embodiments, the in-coupling element may be absent though and in such cases it is, for example, possible to get the light signal 104 into the optical waveguide 110 by illuminating a side surface of the optical waveguide 110 directly.

In the waveguide 110, the light signal 104 may advance by being reflected repeatedly inside the waveguide, interacting with elements 112a until it interacts with elements 112 which cause it to be deflected from waveguide 110 to air, toward eye 120 as image producing light signals 114. Elements 112a and 112 may be located on either side or both sides of the optical waveguide 110, wherein a side of the optical waveguide 110 refers to the side which is towards the eye 120 or to the "outside world" side. Elements 112 and 112a may comprise partially reflecting mirrors, surface relief gratings or other diffractive structures, for example. Elements 112a may be arranged, for example, to spread light field 100 inside waveguide 110 such that the image of the waveguide display is correctly generated. Light from different angular aspects of light field 100 will interact with elements 112 so that light signals 114 will produce the image encoded in light field 100 on the retina of an eye 120.

Elements 112 may cause the light signal 104 to leave the waveguide 110 at multiple exit locations. As a consequence, the user will perceive the image encoded in light field 100 in front of his eyes 120. As the waveguide 110 may be, at least in part, transparent, the user may also advantageously see his real-life surroundings through waveguide 110 in case the waveguide-based display is head-mounted, for example. Light is released from the waveguide 110 as a consequence of the action of the elements 112, i.e., elements 112 may be referred to as out-coupling elements or structures.

The example system illustrated in FIG. 1 comprises three light sources 140 and at least one processor 150 may be configured to control the light sources 140. This is an example to which the present disclosure is not limited, rather, there may be fewer than three, or more than three, light sources 140. The light sources 140 may be considered as monochromatic in the sense that they may produce either narrow spectral band of light with a single peak wavelength, as in lasers, or their spectral band may be wider, as with LEDs. Light sources with more complicated spectral distributions are also possible.

To produce a colour image encoded in the light field 100 in angular space, the light sources 140 may, for example, be programmatically controlled by processor 150. In instances where the mirror 130 is present, the light sources 140 and the mirror 130 may be synchronized with each other such that light from the light sources 140 illuminates specific angular regions of the angular space 100 in a controlled manner so as to produce therein a representation of a colour image which reproduces a still or moving input image received from an external source, such as, for example, a virtual reality or augmented reality computer. The still or moving image received from the external source may comprise a digital image or a digital video feed, for example. The image encoded in light field 100 is thus configurable by provision of a suitably selected input image.

To produce a specific colour at a given aspect in angular space of the light field 100, this given aspect in the angular space may be illuminated by a set of at least three light sources 140 for example. This specific colour is then reproduced by the light signals 114, as light from the given aspect in the angular space of light field 100 proceeds in waveguide 110 to an element 112, possibly via elements 112a, where it exists at an angle corresponding to the given aspect in the angular space 100.

Embodiments of the present invention aim to improve capacity of the optical waveguide 110. Such improved optical waveguides may be used for example in head-mounted displays, HMDs, and Head-Up Displays, HUDs, which can be implemented using optical waveguide technology, e.g., for augmented reality or virtual reality type applications. The (retina of the) human eye is almost polarization insensitive, i.e., different polarization states are not usually discernible in normal observation conditions (Haidinger's brush shows that humans can weakly detect polarization states in ideal conditions, but this effect is irrelevant for display purposes). This insensitivity may be utilized, for example, in smartphone displays, which may show a 'rainbow' effect when observed through a polarizer.

According to embodiments of the present invention, two light signals may be conveyed independently from each other through a waveguide as long as they correspond to two orthogonal polarization states, or at least partially orthogonal polarization states, when entering the waveguide 110. The apparatus causing the different polarization states may or may not be part of the in-coupling arrangement of the waveguide. In some example embodiments, the in-coupling grating 103 is designed to produce two light signals with orthogonal polarizations, or at least partially mutually orthogonal polarizations. In some example embodiments, light signal incident into the in-coupling grating 103 may already comprise orthogonally polarized first and second signals.

For instance, a first light signal may use a clockwise polarization and a second light signal may use a counterclockwise polarization, but more complex arrangements are also possible. The waveguide 110 may be so designed (optimized) that its effect on the light field intensity (change in total light field intensity between the in-coupling region and any particular out-coupling region) is (nearly) polarization insensitive. This may be ensured by requiring all light-field-waveguide interactions to be polarization insensitive, but it is more practical to require only the total end-to-end channels to be polarization insensitive. Indeed, this is an extension of the typical requirement, that the intensities of all wavelengths of interest are mapped in the same way (colour uniformity) to each out-coupling region/ structure and in each propagation angle of interest, to include uniformity across polarization states as well.

It can be shown, using for example the so-called polarization identity of Hilbert spaces, that a polarization independent mapping of intensity is sufficient for preserving the orthogonality of the polarization states from the in-coupling grating to any specific out-coupling grating. The polarization states will, however, be rotated by the propagation inside the waveguide in different amounts depending on the wavelength, propagation angle and out-coupling position, and this rotation must be accounted for by the out-coupling gratings in order to combine the partial images correctly. Therefore, the rotation of the polarization state must be modelled and incorporated in the waveguide design process (optimization).

Figure 2:
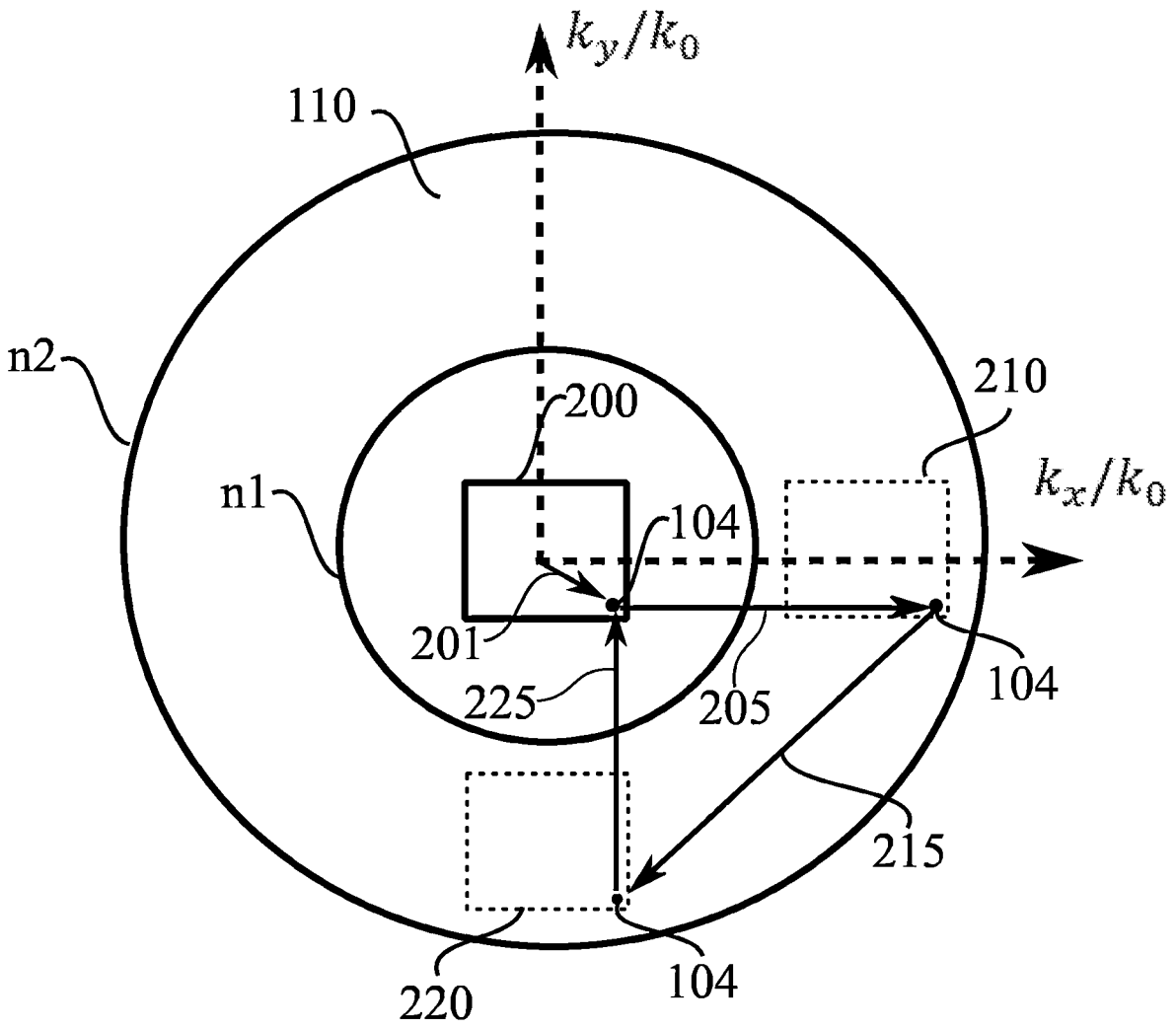
FIG. 2 illustrates a first exemplary wave vector diagram in the $(k_x, k_y)$ plane in accordance with at least some embodiments of the present invention.

FIG. 2 illustrates a first exemplary wave vector diagram in the $(k_x, k_y)$ plane in accordance with at least some embodiments of the present invention. The first exemplary wave vector diagram may demonstrate the wave vector diagram of the optical waveguide 110 of FIG. 1, for example. FIG. 2 shows how the normalized wave vector components representing the pixels of an image rectangle 200 (we note that a rectangle is used for illustrative purposes although the image shape can be arbitrary and, furthermore, an image that is rectangular to the viewer actually has a pillow-shaped representation in the wave vector diagram), i.e., light signal 104 of FIG. 1 (marked by the black dot in FIG. 2), may be moved (in general split into different positions) with respect to their original position (input/ output state) inside the inner circle when the light field interacts with the gratings in the waveguide. The light signal 104 may have a spectral characteristic in a visible spectrum, such as a distinct spectral peak at a certain wavelength. The light signal 104 may for example have a wavelength of a primary colour (blue, green, red).

As shown in FIG. 2, the normalized wave vector components corresponding to the pixels in the image box 200 (arrow 201 represents a 2D projection of the normalized wavevector of a pixel, normalized wavevector is only plotted inside rectangle 200 for simplicity) and the light signal 104 may be shifted by a grating induced vector 205 of an in-coupling grating, such as the in-coupling structure 103 in FIG. 1 in a waveguide, such as 110, from within the inner circle of the wavevector diagram, which represents the propagation angles that are in-coupled to and out-coupled from the waveguide, to a first location 210 in the circular annulus of the diagram, which represents the waveguide modes that propagate inside the waveguide by total internal reflection. Then, the normalized wave vector components of a pixel may be shifted by a grating induced vector 215 of the optical waveguide 110 to at least one other location 220 within the diagram.

In some embodiments, the refractive indices may be $n_1=1$ (air surrounding the waveguide) and $n_2=2$ (waveguide material). The annulus (between the circles of radius $n_1$ and radius $n_2$) may be referred to as an outer part of the diagram or simply annulus, and the area within inner circumference $n_1$ may be referred to as an inner circle of the diagram. In the inner circle of the diagram the light signal 104 may propagate outside the waveguide (in air) or inside the waveguide, while the annulus only corresponds to propagation inside the waveguide. In some embodiments, the waveguide may be made of glass, plastic, or any other suitable waveguide material. In some embodiments, the refractive index of the waveguide material may be at least 1.4, or at least 1.7, or at least 2.0. The area of the annular region relates to the capacity of the optical waveguide 110 to transmit light at a single wavelength and a single polarization state.

Finally, the normalized wave vector components, corresponding to the pixels in the image box 200 and the light signal 104, may be shifted from the location 220 in the diagram by a grating induced vector 225 of an out-coupling grating, or structure in general, such as the as out-coupling elements 112 in FIG. 1, back to the inner circle, which enables the light field to escape the waveguide.

A challenge addressed by the present invention is that when an image is brought to the optical waveguide 110, the image size and resolution are limited by the waveguide capacity (i.e., it is not possible to increase the image size or resolution arbitrarily). The resolution is limited by the number of discernible angular directions inside the waveguide, which is related to the waveguide thickness, but here we are interested in limitations to the image size (angular extent of the image), which is related to the difference between the refractive indices of the waveguide and the surrounding material.

Specifically, the capacity of the waveguide is the area of the annular region in the diagram and this capacity can be divided into two parts; the spatial extent (in the diagram) corresponding to propagation directions (pixels) and the resolution thereof, which corresponds to the number of discernible pixels. Here we will use the term only in reference to the former property. Since the locations inside the annular region also represent propagation directions inside the waveguide, not all of the capacity can be (directly) utilized when the image is to be relayed from one part of the waveguide (in-coupling region) to other parts of the waveguide (out-coupling regions/structures). That is, although backtracking is an option, the main propagation direction must nevertheless be from the in-coupling region toward an out-coupling region/structure.

Furthermore, when gratings are used for guiding light in the waveguide, the image region can be shifted in the diagram when gratings are used, but not scaled or rotated, and the distance shifted depends on the wavelength in a hard-to-control way. Hence a splitting of the image region is often required, for example when large field-of-view images need to be conveyed by a waveguide. Since different parts of the image cannot be transmitted by the same regions in the annulus, as that would lead to cross-talk in the image, it is challenging to get the different partial images to propagate from the in-coupling region to the out-coupling regions of interest, let alone to do so in a way which leads to a uniform image intensity.

Embodiments of the present invention seek to mitigate this challenge, by doubling the capacity of the waveguide using orthogonal, or at least partially orthogonal, polarization states. In particular, each location, and hence propagation direction, in the annulus can contain two parts of an image. For instance, an image may be divided to two so that a first half of the image (e.g., left side pixels) is conveyed using a first polarization and a second half of the image (e.g., right side pixels) is conveyed using a second polarization. The image may be divided to the first and second polarizations also in other ways, for example, selecting odd columns of the pixels to the first half of the image and even columns of pixels to the second half.

We note that although the partial images may overlap in the wavevector diagram at different locations of the waveguide, the design principle here is that the partial images can be separately recovered at out-coupling as long as the overlapping parts of the images have orthogonal polarization states when in-coupled and the relative intensity changes between in-coupling and out-coupling are the same for all polarization states (any two orthogonal states).

Specifically, it is not necessary to explicitly require the overlapping partial images to be of orthogonal polarization during waveguide propagation, even when they occupy overlapping regions in the wavevector diagram. The different polarization states of the partial images may be generated for example at the light source or during in-coupling (pre-in-coupling, in-coupling region or using multiple gratings).

Figure 3:
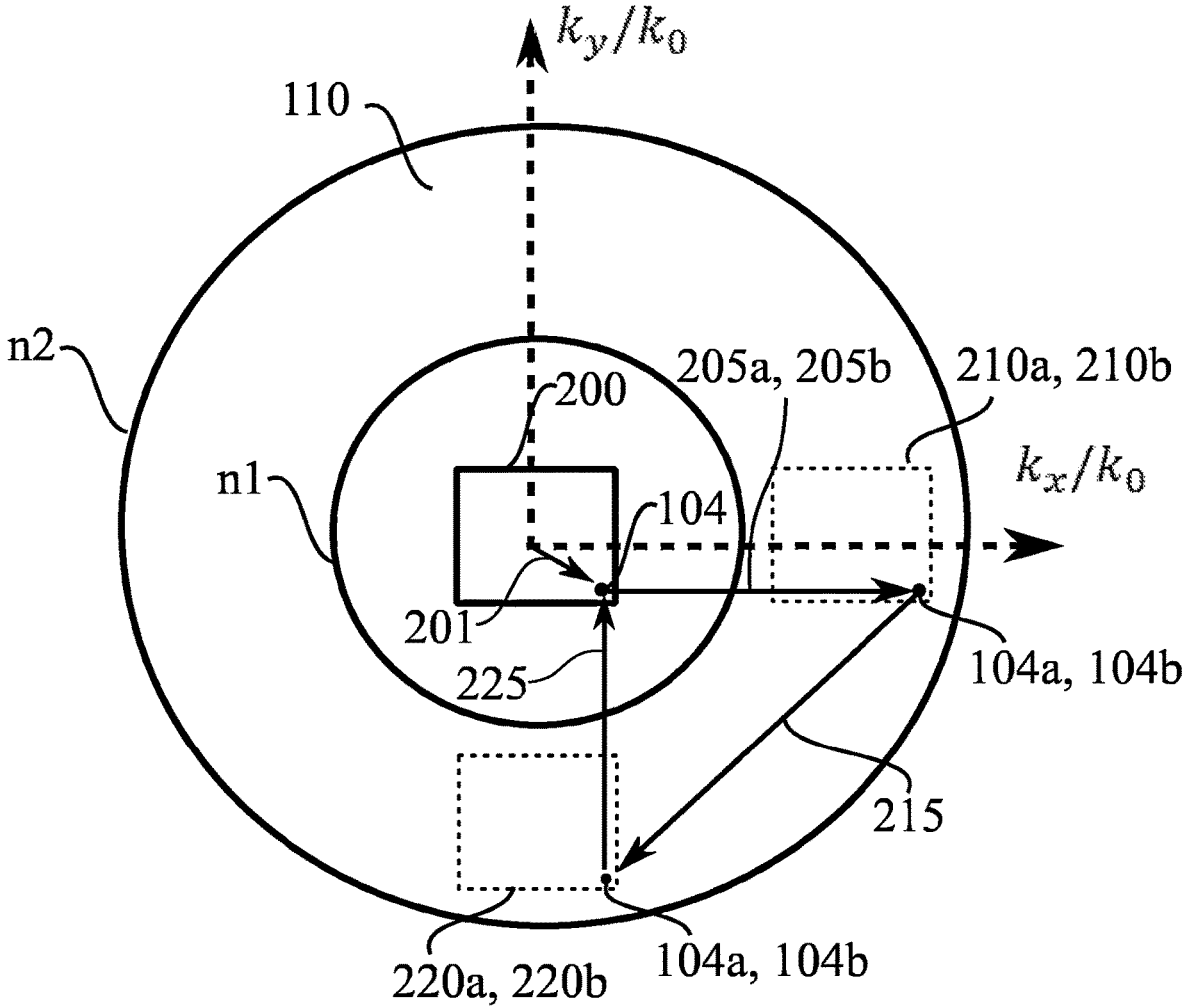
FIG. 3 illustrates a second exemplary a wave vector diagram in the $(k_x, k_y)$ plane in accordance with at least some embodiments of the present invention.

FIG. 3 illustrates a second exemplary wave vector diagram in the $(k_x, k_y)$ plane in accordance with at least some embodiments of the present invention. The second exemplary wave vector diagram may demonstrate the wave vector diagram of the optical waveguide 110 of FIG. 1, for example. Similarly as FIG. 2, FIG. 3 shows how the normalized wave vector components corresponding to the pixels of an image box 200 and the location of an image point, i.e., light signal 104 of FIG. 1 (marked by the black dot), may move with respect to the annulus in response to grating interaction(s).

More specifically, FIG. 3 demonstrates how the normalized wave vector components of the pixels of the image box 200 may be shifted (diffracted) by grating induced vectors 205a and 205b of an in-coupling grating, such as the in-coupling structure 103 in FIG. 1, from the inner circle of the diagram (fields propagating outside and inside waveguide 110) to a first location 210a and a second location 210b within the annular region (waveguide modes in the waveguide 110), respectively. The in-coupling grating may be arranged to diffract the incoming light signal 104 into a first version 104a of the light signal 104 with a first polarization and a second version 104b of the light signal 104 with a second polarization.

The in-coupling grating may be further arranged to diffractively couple the first version 104a and the second version 104b of the light signal 104 into the optical waveguide 110. The first version 104a and the second version 104b of the light signal 104 may be on top of each other in the wavevector diagram, i.e., the locations of the first version 104a and the second version 104b of the light signal 104 may overlap at least partially. Due to the use of orthogonal polarization states, or at least partly orthogonal polarization states, the first version 104a and the second version 104b of the light signal 104 can be separated when out-coupling the signal from the waveguide.

The first polarization may be at least partly orthogonal to the second polarization, thereby enabling differentiation of the light rays 104a and 104b after the optical waveguide 110 has conveyed the first version 104a of the light signal 104 with the first polarization and the second version 104b of the light signal 104 with the second polarization to an out-coupling grating, which may then combine the two partial images to produce the image conveyed towards an eye, to generate a waveguide-based display.

In an embodiment, the out-coupling grating, or structure, is arranged to produce a combined image on the retina of the observer's eye (or any other relevant recording device) from the first and the second version of the light signals. Thus, the image boxes 220a and 220b in FIG. 3 are separated when they are mapped to the inner circle of the wavevector diagram. The intensity of the first version 104a may be the same, or essentially the same, as the intensity of the second version 104b inside the inner circle (at the output), as long as it is ensured that their relative changes are, to a sufficient degree, equal.

Typically, the light signal jumps in the wave vector annulus (between the inner and outer circles) while it is being conveyed inside the waveguide, and when it is out-coupled it is mapped to inside the inner circle. Using orthogonal polarizations, or at least partly orthogonal polarizations, it is possible to separate the first version 104a of the light signal 104 and the second version 104b of the light signal 104 at out-coupling, if the intensities of the first version 104a of the light signal 104 and the second version 104b of the light signal 104 changes equally (or approximately equally) during waveguide propagation from the in-coupling region to any out-coupling region.

Upon diffracting the incoming light signal 104 into the first version 104a of the light signal 104 with the first polarization and the second version 104b of the light signal 104 with the second polarization, the normalized wave vector components representing the pixels of the image 200 may be shifted by vectors, such as the grating induced vector 215 in FIG. 3, from the first location 210a to at least one other location 220a and from the second location 210b to at least one other location 220b. That is to say, the first version 104a of the light signal 104 may be shifted from the first location 210a to at least one other location 220a. The second version 104b of the light signal 104 may be similarly shifted from the second location 210b to at least one other location 220b. Said other locations 220a and 220b may overlap at some point, i.e., the first version 104a and the second version 104b of the light signal 104 may be conveyed at least partially at same locations. Nevertheless, the first version 104a and the second version 104b of the light signal 104 can be differentiated in the end due to the use of different polarizations.

The light signal 104 may have a spectral characteristic in visible spectrum and the first version 104a and the second version 104b of the light signal 104 may have the same spectral characteristic in visible spectrum as the light signal 104. Nevertheless, as the first version 104a of the light signal and the second version 104b of the light signal have different polarizations, the first version 104a and the second version 104b of the light signal 104 can be differentiated at the out-coupling grating/structure. Thus, the channel capacity of the optical waveguide 110 can be doubled if the rotation of the polarization state, occurring when the first version 104a and the second version 104b of the light signal 104 are conveyed in the optical waveguide 110, can be accounted for in the out-coupling gratings In some embodiments, the polarizations of the first version 104a and the second version 104b of the light signal 104 may get mixed up, but if the polarization states of the first version 104a and the second version 104b of the light signal 104 are orthogonal, the first version 104a and the second version 104b of the light signal 104 can be differentiated at the out-coupling grating/structure anyway.

The first version 104a of the light signal 104 and the second version 104b of the light signal 104 may travel via different routes before exiting, for example if they pass several gratings on their way from the in-coupling region to an out-coupling region. However, if the relative change in intensity of the first version of the light signal is equal to the relative change in intensity of the second version of the light signal when they are conveyed in the optical waveguide 110, the first and the second versions of the light signal may be separated at out-coupling.

In some embodiments, polarizations of the first and the second versions of the light signal may rotate while being conveyed in the optical waveguide 110. In such a case, this rotation may be modelled, so as to facilitate the design of out-coupling gratings, which are able to separate between the first and the second versions of the light signal in order to combine them in the correct way for display.

For instance, the rotation of the polarization between the in-coupling region and a certain exit location may be modelled, to see how the polarizations of the first and the second light signal rotate while being conveyed in the optical waveguide. Upon finding out how much the polarizations rotate, while preserving their mutual orthogonality or at least partly mutual orthogonality, a suitable out-coupling grating behaviour may be selected, which can separate between the first and the second light signals. That is to say, it may be necessary to model how two images with different polarization states propagate from the in-coupling grating to the out-coupling grating, to be able to separate between the partial images in order to combine them back into one image. So there may be a polarization-mapping between the in-coupling and the out-coupling region and a suitable out-coupling grating may be then selected based on this mapping.

In some embodiments, the optical waveguide arrangement may comprise at least one processor, such as the processor 150 of FIG. 1. The at least one processor may be configured to produce a known polarization distribution of the light signal 104. That is to say, the polarization distribution produced by the at least one processor may be such that for example a (set of) in-coupling gratings can diffract the light signal 104 into the first version 104a and the second version 104b, with mutually orthogonal polarization states.

Alternatively, or in addition, the at least one processor may be configured to directly generate given polarization states for the first version 104a and the second version 104b of the light signal. As the polarization state is two-dimensional, it is desirable to produce the partial images with orthogonal polarization states. The polarization states of the two images are chosen so that when the images overlap immediately after in-coupling in the wavevector diagram they have orthogonal, or at least partially orthogonal, polarizations. This means that the polarization state of each image may be fixed across the whole image, or it may have any distribution as long as the other image has the orthogonal polarization state in the overlapping regions. The polarization state distributions can be the same or may be different for different wavelengths. In some instances, the orthogonality condition may only be partially fulfilled, for example due to design and manufacturing constraints, with a corresponding degradation of system performance. As an example, specific orthogonal polarization states may be selected for a right and left side of an image using the at least one processor either directly or by enabling the use of (pre-)in-coupling gratings for the purpose.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in HMDs and HUDs.

Acronyms List

HMD Head-Mounted Display
HUD Head-Up Display
LED Light-Emitting Diode

| REFERENCE SIGNS LIST | |
| --- | --- |
| 100 | light field |
| 102 | optical guides |
| 103 | in-coupling structure |
| 104 | light signals |
| 110 | waveguide |
| 112 | elements |
| 114 | directed light |
| 120 | eye(s) |
| 130 | mirror |
| 140 | light sources |
| 150 | processor |
| 200, 210, 220 | image boxes |
| 201 | a 2D projection of the normalized wavevector of a pixel |
| 205, 215. 225 | shifts |

The invention claimed is:

1. An optical waveguide arrangement comprising an in-coupling structure and an optical waveguide, wherein
  the in-coupling structure is arranged to diffract an incoming light signal having a spectral characteristic in visible spectrum into a first version of the light signal with a first polarization and a second version of the light signal with a second polarization, wherein the first polarization is at least partially orthogonal compared to the second polarization, and the in-coupling structure is further arranged to diffractively couple the first and the second versions of the light signal into the optical waveguide; and
  the optical waveguide is arranged to convey the first version of the light signal with the first polarization and the second version of the light signal with the second polarization towards an eye, to generate a waveguide-based display wherein a relative change in intensity of the first version of the light signal is the same, or essentially the same, as a relative change in intensity of the second version of the light signal, when the first and the second versions of the light signal propagate from the in-coupling structure to an out-coupling structure,
  wherein the out-coupling structure is arranged to compensate for rotation of polarization states of the first version and the second version of the light signal, said rotation occurring when the first version and the second version of the light signal are conveyed in the optical waveguide, and
  wherein the waveguide is configured so that total end-to-end channels are polarization insensitive.

2. An optical waveguide arrangement according to claim 1, wherein the spectral characteristic is a distinct spectral peak in visible spectrum, such as a certain wavelength.

3. An optical waveguide arrangement according to claim 1, wherein the first and the second versions of the light signal have the spectral characteristic in visible spectrum.

4. An optical waveguide arrangement according to claim 1, wherein the first version and the second version of the light signal overlap at least partially both spatially and in terms of their wave vectors and wavelengths, while conveyed in the optical waveguide.

5. An optical waveguide arrangement according to claim 1, wherein the in-coupling structure is arranged to guide the first version of the light signal to a first location in a wave vector annulus and the second version of the light signal to a second location in the wave vector annulus.

6. An optical waveguide arrangement according to claim 1, wherein the waveguide is made of glass or plastic.

7. An optical waveguide arrangement according to claim 1, wherein a relative change in intensity of the first version of the light signal is the same as a relative change in intensity of the second version of the light signal, when the first version and the second version of the light signal are conveyed in the optical waveguide.

8. An optical waveguide arrangement according to claim 1, wherein the out-coupling structure is arranged to produce a combined image from the first and the second version of the light signals for an observer.

9. An optical waveguide arrangement according to claim 1, wherein the first and the second polarizations are partially mutually orthogonal or fully orthogonal.

10. An optical waveguide arrangement according to claim 1, further comprising at least one processor configured to cause production of a light signal with a known polarization distribution across the image the light signal represents.

11. An optical product, comprising the optical waveguide arrangement according to claim 1 and a light source adapted to direct the light signal to the in-coupling structure.

12. A personal display device, comprising the optical waveguide arrangement according to claim 1.

13. An optical waveguide arrangement according to claim 1, wherein the waveguide is a waveguide material having a refractive index of at least 1.4.

14. An optical waveguide arrangement according to claim 1, wherein the waveguide is a waveguide material having a refractive index of at least 1.7.

15. An optical waveguide arrangement according to claim 1, wherein the waveguide is a waveguide material having a refractive index of at least 2.0.

16. A personal display device configured as a head-up display, comprising the optical waveguide arrangement according to claim 1.

17. A personal display device configured as a head-mounted display, comprising the optical waveguide arrangement according to claim 1.

18. An optical waveguide arrangement according to claim 1, wherein one of the first polarization or second polarization is a clockwise polarization, and the other of the first polarization or second polarization is a counter-clockwise polarization.

* * * * *